(12) United States Patent
Li

(10) Patent No.: US 6,613,363 B1
(45) Date of Patent: Sep. 2, 2003

(54) BIODEGRADABLE CHEWING GUM BASES INCLUDING PLASTICIZED POLY(D,L-LACTIC ACID) AND COPOLYMERS THEREOF

(75) Inventor: Weisheng Li, Montclair, NJ (US)

(73) Assignee: Wm. Wrigley Jr. Company, Chicago, IL (US)

( * ) Notice: Subject to any disclaimer, the term of this patent is extended or adjusted under 35 U.S.C. 154(b) by 0 days.

(21) Appl. No.: 09/889,952

(22) PCT Filed: Oct. 2, 1998

(86) PCT No.: PCT/US98/20656

§ 371 (c)(1),
(2), (4) Date: Feb. 27, 2002

(87) PCT Pub. No.: WO00/19837

PCT Pub. Date: Apr. 13, 2000

(51) Int. Cl.[7] ................................................. A23G 3/30
(52) U.S. Cl. .............................................. 426/3; 426/4
(58) Field of Search ................................. 426/3, 4, 5, 6

(56) References Cited

U.S. PATENT DOCUMENTS

| | | | |
|---|---|---|---|
| 5,142,023 A | 8/1992 | Gruber et al. | 528/354 |
| 5,258,488 A | 11/1993 | Gruber et al. | 528/354 |
| 5,357,034 A | 10/1994 | Fridman et al. | 528/354 |
| 5,357,035 A | 10/1994 | Gruber et al. | 528/354 |
| 5,360,892 A | 11/1994 | Bonsignore et al. | 528/354 |
| 5,366,740 A | 11/1994 | Shaw et al. | 426/3 |
| 5,470,974 A | 11/1995 | Summerton et al. | 544/118 |
| 5,482,722 A | 1/1996 | Cook | 426/3 |
| 5,508,378 A | 4/1996 | Ohara et al. | 528/354 |
| 5,580,590 A | 12/1996 | Hartman | 426/3 |
| 5,672,367 A | 9/1997 | Grijpma et al. | 426/6 |

FOREIGN PATENT DOCUMENTS

EP 0 711 506 A2 5/1996

OTHER PUBLICATIONS

Torres et al. article entitled: "Poly(lactic acid) Degradation in Soil or Under Controlled Conditions"; *Journal of Applied Polymer Science*, vol. 62, 2295–2302 (1996).

Linko et al. article entitled: "Producing high molecular weight biodegradable polyesters"; *Chemtech*, Aug. 1996, pp. 25–31.

Seeley article entitled: "Can Lactic Polymers Turn Sour to Sweet?"; *Chemical Business*, Feb. 1992, pp. 28–30.

Gajria et al. article entitled: "Miscibility and biodegradability of blends of poly(lactic acid) and poly(vinyl acetate)"; *Polymer*, vol. 37, No. 3, 1996, pp. 437–444.

Huang et al. article entitled: "Crystallization and Microstructure of Poly(L–lactide–co–meso–lactide) Copolymers"; *Macromolecules*, 1998, 31, 2593–2599.

Tsuji et al. article entitled: "Blends of Isotactic and Atactic Poly(lactide). I. Effects of Mixing Ratio of Isomers on Crystallization of Blends from Melt"; *Journal of Applied Polymer Science*, vol. 58, 1793–1802 (1995).

Klemchuk article entitled: "Degradable Plastics: A Critical Review"; *Polymer Degradation and Stability*, 27 (1990) 183–202.

Verser et al. article entitled: "Poly (Lactic Acid) as an Engineered Material"; *Corn Utilization Conference Program Proceedings*—Jun. 4–6, 1996; pp. 1–4.

Suggs et al. article entitled: "Synthetic Biodegradable Polymers for Medical Applications"; *Physical Properties of Polymers Handbook*, Chapter 44; pp. 615–624.

Pitt et al. article entitled: "Modification of the Rates of Chain Cleavage of Poly(e–Caprolactone) and Related Polyesters in the Solid State"; *Journal of Controlled Release*, 4 (1987) 283–292.

Leenslag et al. article entitled: "Resorbable materials of poly(L–lactide)"; *Biomaterials*, 1987, vol. 8, Jul., pp. 311–314.

Sheth et al. article entitled: "Biodegradable Polymer Blends of Poly(lactic acid) and Poly (ethylene glycol)"; *Journal of Applied Polymer Science*, vol. 66, 1495–1505 (1997).

Miller et al. article entitled: "Degradation Rates of Oral Resorbable Implants (Polylactates and Polyglycolates): Rate Modification with Changes in PLA/PGA Copolymer Ratios"; *J. Biomed. Mater. Res.*, vol. 11, pp. 711–719 (1977).

Labrecque et al. article entitled: "Citrate Esters as Plasticizers for Poly (lactic acid)"; *Journal of Applied Polymer Science*, vol. 66, 1507–1513 (1997).

*Primary Examiner*—Arthur L. Corbin
(74) *Attorney, Agent, or Firm*—Bell, Boyd & Lloyd LLC

(57) ABSTRACT

Gum base and chewing gums including plasticized poly(D, L-lactic acid) and poly(D,L-lactic acid-co-glycolic acid) are provided as well as methods of making same.

21 Claims, 2 Drawing Sheets

BIODEGRADABLE CHEWING GUM BASES INCLUDING PLASTICIZED POLY(D,L-LACTIC ACID) AND COPOLYMERS THEREOF

BACKGROUND OF THE INVENTION

The present invention relates generally to chewing gum compositions and methods for making same. More specifically, the present invention relates to chewing gum compositions that are more environmentally acceptable than typical compositions.

For hundreds of years, people have enjoyed chewing gum like substances. In the late 1800's, the predecessor to today's chewing gum compositions were developed. Today chewing gum is enjoyed daily by millions of people worldwide.

Chewed gum is usually disposed of in the wrapper that initially houses the chewing gum. Likewise, chewed gum can be disposed of in other substrates by wrapping the substrate around the chewing gum.

Although chewed gun can be easily disposed of without creating any problems, chewing gum when improperly disposed of can create environmental issues. In this regard, the improper disposal of chewing gum, e.g., expectorating the chewing gum on a sidewalk, floor, or like area can create a nuisance. Typically, these gum cuds are mainly composed of a water insoluble masticatory part which is represented by the gum base. Due to its formulation, these gum cuds have an adhesive like characteristic. Therefore, the chewed gum cuds can stick to surfaces on to which it is placed. This can create issues if the chewed gum cuds are improperly discarded.

Rapidly biodegradable chewing gums would be a solution to this problem. Conventional chewing gums are formulated from natural and/or synthetic elastomers and resins. Although some natural resins and elastomers such as Chicle, Jelutong, natural rubber, esters of wood rosin, and polyterpene resins may be still used in gum bases, today synthetic polymers such as styrene-butadiene rubber (SBR), butyl rubber, polyisobutylene, and poly(vinyl acetate) are the dominant masticatory substances. Unfortunately, these synthetic polymers are inherently resistant to biodegradation.

There have been at least a couple of attempts at providing biodegradable chewing gum. Published PCT Application No. PCT/US97/11008 discloses lactic acid based copolymers for use as a masticatory substance. The chewing gum base comprises approximately 3 to about 99% by weight poly(lactic acid) copolymers selected from the group consisting of poly(lactic acid-dimer fatty acid-oxazoline) copolymers and poly(lactic acid-diol-urethane) copolymers.

U.S. Pat. No. 5,672,367 sets forth biodegradable chewing gums based on poly(lactic acid-co-caprolactone) elastomers. Although the elastomers may have desirable chewing characteristics, the toxic caprolactone monomer residues may prevent the elastomers from being used as a masticatory substance.

SUMMARY OF THE INVENTION

The present invention provides a gum base, and resultant chewing gum, that is environmentally friendly. As used in the application, the term "environmentally friendly" refers to chewing gum compositions that: will degrade rapidly; can be easily removed from indoor or outdoor surfaces; can be ingested after chewing; and/or will dissolve in the mouth after a period of chewing.

Pursuant to the present invention, environmentally friendly chewing gum bases are provided that are biodegradable. These chewing gum bases are formulated with poly(D,L-lactide acid) and poly(D,L-lactide acid-co-glycolic acid).

To this end, in an embodiment, the present invention provides a chewing gum comprising: plasticized poly(D,L-lactic acid) and poly(D,L-lactic acid-co-glycolic acid).

In an embodiment, the plasticized poly(D,L-lactic acid) and poly(D,L-lactic acid-co-glycolic acid) have a crystallinity of less than about 18%.

In an embodiment, the poly(D,L-lactic acid) has a crystallinity of less than about 10%.

In an embodiment, the poly(D,L-lactic acid) contains at least 5mole percent of at least one component chosen from the group consisting of D-lactic acid and D-lactide segments.

In an embodiment, the poly(D,L-lactic acid) has a molecular weight of from approximately 2000 to about 2,000,000 g/mol.

In an embodiment, the poly(D,L-lactic acid) has a molecular weight of from approximately 10,000 to about 500,000 g/mol.

In an embodiment, the poly(D,L-lactic acid-co-glycolic acid) has a crystallinity of less than about 10%.

In an embodiment, the poly(D,L-lactic acid-co-glycolic acid) includes approximately 20 to about 70 mole percent of at least one component chosen from the group consisting of glycolic acid and glicolide.

In an embodiment, the poly(D,L-lactic acid-co-glycolic acid) has a molecular weight of approximately 10,000 to about 500,000 g/mol.

In an embodiment, the chewing gum includes at least one plasticizer chosen from the group consisting of glycerides (mono-, di-, and tri-), adipates, citrates, poly(ethylene glycol), poly(propylene glycol), and phthalates.

In another embodiment, the present invention provides a gum base. The gum base comprises plasticized poly(D,L-lactic acid) and poly(D,L-lactic acid-co-glycolic acid).

In an embodiment, the plasticized poly(D,L-lactic acid) and poly(D,L-lactic acid-co-glycolic acid) have a crystallinity of less than about 18%.

In an embodiment, the poly(D,L-lactic acid) has a crystallinity of less than about 10%.

In an embodiment, the poly(D,L-lactic acid) contains at least 5 mole percent of at least one component chosen from the group consisting of D-lactic acid and D-lactide segments.

In an embodiment, the poly(D,L-lactic acid) has a molecular weight from approximately 2000 to about 2,000,000 g/mol.

In an embodiment, the poly(D,L-lactic acid) has a molecular weight from approximately 10,000 to about 500,000 g/mol.

In an embodiment, the poly(D,L-lactic acid-co-glycolic acid) has a crystallinity of less than about 10%.

In an embodiment, the poly(D,L-lactic acid-co-glycolic acid) includes approximately 20 to about 70 mole percent of at least one component chosen from the group consisting of glycolic acid and glicolide.

In an embodiment, the plasticized poly(D,L-lactic acid) and poly(D,L-lactic acid-co-glycolic acid) comprises approximately 10 to about 70% by weight of the gum base.

In yet another embodiment of the present invention, a method of manufacturing gum base is provided comprising the step of plasticizing poly(D,L-lactic acid) and poly(D,L-lactic acid-co-glycolic acid) and adding a resultant product to other gum base components.

In an embodiment of the method, the resultant product comprises approximately 20 to about 70 mole percent of the gum base.

Additionally, the present invention provides a method of manufacturing chewing gum comprising the step of adding a gum base including plasticized poly(D,L-lactic acid) and poly(D,L-lactic acid-co-glycolic acid) to a water soluble portion.

It is an advantage of the present invention to provide an environmentally friendly chewing gum base.

It is a further advantage of the present invention to provide a chewing gum that is biodegradable.

Still further, it is an advantage of the present invention to provide a chewing gum composition made from a biodegradable chewing gum base.

Another advantage of the present invention is to provide a degradable chewing gum containing an environmentally friendly chewing gum base.

Moreover, an advantage of the present invention is to provide a chewing composition that when chewed, if improperly discarded onto a surface, can be easily removed therefrom.

Additional features and advantages of the present invention are described in and will be apparent from the detailed description of the presently preferred embodiments and from the drawings.

DETAILED DESCRIPTION OF THE PREFERRED EMBODIMENTS

Figure 1:
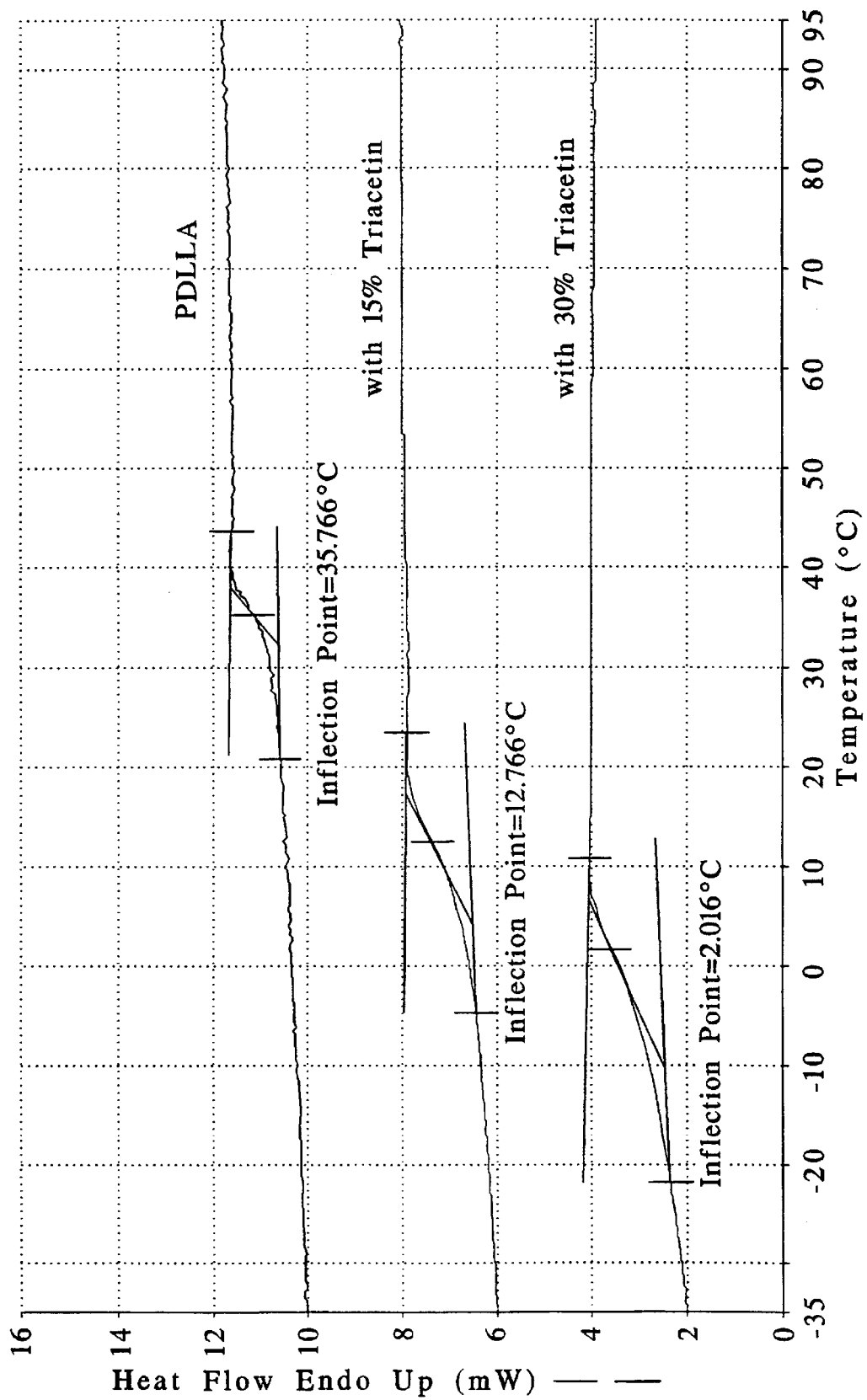
FIG. 1 illustrates, graphically, DSC thermographs of virgin and plasticized poly(D,L-lactic acid).

The present invention provides improved gum bases. Specifically, the present invention provides gum bases that are environmentally friendly. In this regard, the gum bases are biodegradable. Additionally, improved chewing gums as well as ingredients used for the gum bases are described.

The gum base contains amorphous poly(D,L-lactic acid) and poly(D,L-lactide acid-co-glycolic acid). It should be noted that in the art poly(D,L-lactic acid) may also be referred to as poly(D,L-lactide) and poly(D,L-lactic acid-co-glycolic acid) may also be referred to as poly(D,L-lactide-co-glycolide).

Both polylactide and the copolymers thereof can degrade automatically to carbon dioxide and water by microorganisms. Pure poly(D,L-lactic acid) and poly(D,L-lactic acid-co-glycolic acid) lack desirable elasticity at room temperature (Tg=35–45° C.). However, it has been found that they can be softened by a number of plasticizers. The plasticized poly(D,L-lactic acid) and poly(D,L-lactic acid-co-glycolic acid) possess good elasticity, and therefore can replace both the rubbers and resins in a conventional gum base.

The gum bases including the plasticized poly(D,L-lactic acid) and poly(D,L-lactic acid-co-glycolic acids) also contain other conventional, but environmentally friendly ingredients. These ingredients include calcium carbonate, hydrogenated vegetable fats, waxes, and glycerol esters. Because the resultant gums are formulated with all biodegradable ingredients, the gum cuds possess complete biodegradability.

Lactic acid has two enantiomeric forms due to the asymmetrically created carbon center: dextrorotatory or D-lactic acid (as shown below at I); and levorotatory or L-lactic acid (as shown below at II).

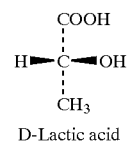

D-Lactic acid

Symbol I.

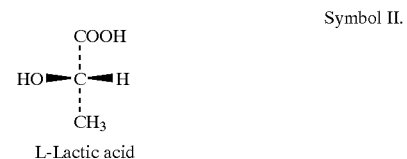

L-Lactic acid

Symbol II.

Consequently, the poly(lactic acid) polymer has two corresponding enantiomeric forms also: PDLA; and PLLA. The racemic mixture of the two is poly(D,L-lactic acid). Both PDLA and PLLA are highly crystalline. The copolymers poly(D,L-lactic acid) are much less crystalline or even amorphous depending on the monomer ratio. Literature has shown that PLLA has 38% crystallinity, while poly(D,L-lactic acid) with 5 mole percent D-lactic acid has only 18% crystallinity. At about a 1:1 ratio, poly(D,L-lactic acid) is amorphous.

Since the common form, PLLA, is highly crystalline and has a glass transition temperature (Tg) around 58° C., it is rigid at room temperature and, not suitable as a chewing gum masticatory ingredient. However, the Poly(D,L-lactic acid) form is amorphous, and has a Tg of about 50° C. It can be plasticized by a number of softeners, resulting in much more rubbery and elastic materials. These plasticized materials offer the desirable chewing characteristics required by chewing gums. It has also been found that poly(D,L-lactic acid) degrades much faster than crystalline PLLA.

The plasticized poly(D,L-lactic acid) and poly(D,L-lactic acid-co-glycolic acid) can be used in a variety of chewing gum products. In general, a chewing gum composition typically comprises a water-soluble bulk portion, a water-insoluble chewable gum base portion, and typically water-insoluble flavoring agents. The water-soluble portion dissipates with a portion of the flavoring agent over a period of time during chewing. The gum base portion is retained in the mouth throughout the chew. The term chewing gum refers to both a chewing and bubble type gum in its general sense.

The water-insoluble portion of the gum typically may contain any combination of elastomers, vinyl polymers, elastomer plasticizers, fillers, softeners, waxes and other optional ingredients such as colorants and antioxidants.

The variety of gum base ingredients typically used provide the ability to modify the chewing characteristics of gums made from the gum base.

Elastomers provide the rubbery, cohesive nature to the gum which varies depending on this ingredient's chemical structure and how it is compounded with other ingredients. Elastomers suitable for use in the gum base and gum of the present invention include poly(D,L-lactic acid) and poly(D,L-lactic acid-co-glycolic acid). Poly(D,L-lactic acid) may have a D-isomer content from approximately 5 to about 95 mol %. Poly(D,L-lactic acid-co-glycolic acid) may have a glycolic monomer content of from approximately 20 to about 70 mol %.

The elastomers for use in a gum base or gum of the present invention are plasticized poly(D,L-lactic acid)s alone or in combination with other typical gum base and gum ingredients. However, the gum base and gum are free of non-degradable elastomers such as butadiene-styrene copolymers (SBR), isobutylene-isoprene copolymers (Butyl rubber), polybutadiene, polyisobutylene, and vinyl polymeric elastomers (polyvinyl acetate, polyethylene, vinyl acetate/vinyl laurate, vinyl acetate/vinyl stearate, ethylene/vinyl acetate) or mixtures thereof.

Other optional ingredients such as antioxidants may also be used in the gum base.

Antioxidants prolong shelf-life and storage of gum base, finished gum or their respective components including fats and flavor oils. Antioxidants suitable for use in gum base or gum of the present invention include butylated hydroxyanisole (BHA), butylated hydroxytoluene (BHT), beta cartenes, tocopherols, acidulants such as Vitamin C, propyl gallate, and other synthetic and natural types or mixtures thereof.

Preferably, the antioxidants used in the gum base are butylated hydroxyanisole (BHA), butylated hydroxytoluene (BHT), tocopherols, or mixtures thereof.

Waxes aid in the solidification of gum bases and improving shelf-life and texture. Wax crystal also improves the release of flavor. The smaller crystal size allows slower release of flavor since there is more hindrance of the flavor's escape from this wax versus a wax having larger crystal sizes.

Preferably, the gum base and gum of the present invention employs waxes containing little if any normal-alkanes, or straight-chained alkanes as they may be called, and contain predominantly iso-alkanes, or branched chain alkanes, having carbon chain lengths greater than 30. Formulation of some gum bases of this type may result in these gum bases being more homogeneous and that have ingredients exhibiting more compatibility with each other. Again, this compatibility is the result of the branched nature of iso-alkanes physically interacting, on a molecular level, with the branched nature of the other gum base ingredients.

Synthetic waxes are produced by means atypical of petroleum wax production and thus are not considered petroleum wax. These synthetic waxes may be used in accordance with the present invention and may be included optionally in the gum base and gum.

The synthetic waxes may include waxes containing branched alkanes and copolymerized with monomers such as but not limited to polypropylene and polyethylene and Fischer-Tropsch type waxes. Polyethylene wax is not in the same category as polyethylene, a polymer of ethylene monomers. Rather, polyethylene wax is a synthetic wax containing alkane units of varying lengths having attached thereto ethylene monomers.

Elastomer plasticizers vary the firmness of the gum base. The plasticizers are glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, synthetic elastomer plasticizers such as terpene resins derived from alpha-pinene, beta-pinene and/or d-limonene and mixtures thereof. As revealed by ASTM D5210-91 test results, some of these plasticizers have certain biodegradability therefore can be used in the present invention as softeners to poly(D,L-lactic acid) and poly(D,L-lactic acid-co-glycolic acid).

The elastomer plasticizers used may be of one type or of combinations of more than one. Typically, the ratios of one to the other are dependent on each respective softening point, on each effect on flavor release, and on each respective degree of tack they cause to the gum.

Fats modify the texture of the gum base by introducing sharp melting transition during chewing. Fats suitable for use in the gum base and gum of the present invention include triglycerides of non-hydrogenated, partially hydrogenated and fully hydrogenated cottonseed oil, soybean oil, palm oil, palm kernel oil, coconut oil, safflower oil, tallow oil, cocoa butter, medium chained triglycerides and the like.

The preferred fats include unsaturated, partially saturated or fully saturated oils that contain, as one or more of their constituent groups, fatty acids of carbon chain length of from 6 to 18. Monoglycerides, diglycerides, acetylated monoglycerides, distilled mono- and diglycerides and lecithin may, from their manufacturing processing, contain triglyceride levels less than 2 percent by weight. Mono- and diglycerides maybe considered as being of the same family as fats (triglycerides), or would be in a family of their own, namely emulsifiers.

Optional fillers used in gum base modify the texture of the gum base and aid in processing. Fillers suitable for use in the gum base and gum of the present invention include carbonate or precipitated carbonated types such as magnesium and calcium carbonate, ground limestone and silicate types such as magnesium and aluminum silicate, clay, alumina, talc, as well as titanium oxide, mono-, di- and tricalcium phosphate, cellulose polymers such as ethyl, methyl and wood or mixtures thereof. The fillers can also be organic powders such as polystyrene, polyethylene, oat fiber, wood fiber, apple fiber, zein, gluten, gliadin, casein, etc. For the present invention, natural organic fillers such as zein, oat fiber, gluten, casein, and cellulose are preferred since they will aid in faster biodegradation.

Particle size can have an effect on texture, cohesiveness, density and processing characteristics of the gum base and its compounding. The smaller the particle size, the more dense and cohesive the final gum base is. Also, by selecting fillers based on their particle size distribution, initial mass compounding may be varied, thus allowing alteration of the compounding characteristics of the initial mass during gum base processing and ultimately the final chew characteristics of gums made from these gum bases. Mean particle size for calcium carbonate and talc fillers typically range from about 0.1 micron to about 15 microns.

The starting mass preferably may comprise one or more of fillers, poly(D,L-lactic acid) or poly(D,L-lactic acid-co-glycolic acid) elastomer, and plasticizers. Preferably, the starting mass is comprised of some or all of the poly(D,L-lactic acid) or poly(D,L-lactic acid-co-glycolic acid) elastomer, some or all of the filler and some or all of the plasticizer.

Flavorants and colorants impart characteristics or remove or mask undesired characteristics. Colorants may typically include FD&C type lakes, plant extracts, fruit and vegetable extracts and titanium dioxide. Flavorants may typically include cocoa powder, heat-modified amino acids and other vegetable extracts.

Gum bases are typically prepared by adding an amount of the elastomer, plasticizer and filler to a heated (50–240° F.) sigmna blade mixer with a front to rear speed ratio of from about 1.2:1 to about 2:1, the higher ratio typically being used for chewing gum base which requires more rigorous compounding of its elastomers.

The initial amounts of ingredients comprising the initial mass may be determined by the working capacity of the mixing kettle in order to attain a proper consistency and by the degree of compounding desired to break down the elastomer and increase chain branching. The higher the level of filler at the start or selection of a filler having a certain particle size distribution, the higher the degree of compounding and thus more of the elastomeric chains are broken, causing lower viscosity bases and thus softer final gum base and gum made from such a base. The longer the time of compounding, the use of lower molecular weight or softening point gum base ingredients, the lower the viscosity and firmness of the fmal gum base.

Compounding typically begins to be effective once the ingredients have massed together. Anywhere from 15 minutes to 90 minutes may be the length of compounding time.

Preferably, the time of compounding is from 20 minutes to about 60 minutes. The amount of added plasticizer depends on the level of elastomer and filler present. If too much elastomer plasticizer is added, the initial mass becomes over plasticized and not homogeneous.

After the initial ingredients have massed homogeneously and compounded for the time desired, the balances of the base ingredients are added in a sequential manner until a completely homogeneous molten mass is attained. Typically, any remainder of elastomer, plasticizer, and filler, are added within 60 minutes after the initial compounding time. The filler and the plasticizer would typically be individually weighed and added in portions during this time. The optional waxes and the oils are typically added after the elastomer and plasticizers and during the next 60 minutes. Then the mass is allowed to become homogeneous before discharging.

Typical base processing times may vary from about one to about three hours, preferably from about 1½ to 2½ hours, depending on the formulation. The final mass temperature when discharged may be between 50° C. and 130° C. and preferably between 70° C. and 120° C. The completed molten mass is emptied from the mixing kettle into coated or lined pans, extruded or cast into any desirable shape and allowed to cool and solidify. Those skilled in the art will recognize that many variations of the above described procedure may be followed.

Examples of the process to make the inventive gum base differ from the typical process and are detailed in the pending Examples below. These are presented to exemplify embodiments of the present invention and in no way are presented to limit the scope of the present invention.

Gum formulas may comprise from about 10 to about 99 weight percent a gum base made in accordance with the present invention in a gum formula typically known to those in the art.

The water-soluble portion of the chewing gum may comprise softeners, sweeteners, flavoring agents and combinations thereof The sweeteners often fill the role of bulking agents in the gum. The bulking agents generally comprise from approximately 5 percent to about 90 percent, preferably from approximately 20 percent to about 80 percent.

Softeners are added to the chewing gum in order to optimize the chewability and mouth feel of the gum. Softeners typically constitute from approximately 0.5 percent to about 25.0 percent by weight of the chewing gum. Softeners contemplated for use in the gum include glycerin, lecithin and combinations thereof. Further, aqueous sweetener solutions such as those containing sorbitol, hydrogenated starch hydrolysates, corn syrup and combinations thereof may be used as softeners and bulking agents in gum. Sugar-free formulations are also typical.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The sweetener for use in the present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweeteners as they may be referred to, typically may include, but are not limited to, alitane, thaumatin, aspartame, sucralose, acesulfame, saccharin and dihydrochalcones. The range of these sweetener types in gum typically may range from approximately 0.02 to about 0.10 weight percent for sweeteners such as alitame, thaumatin and dihydrochalcones, and from approximately 0.1 to about 0.3 weight percent for sweeteners like aspartame, sucralose, acesulfame and saccharin.

A flavoring agent may be present in the chewing gum in an amount within the range of from approximately 0.1 to about 10.0 weight percent and preferably from approximately 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the initial ingredients have been thoroughly mixed, the gum mass is discharged from the mixer and shaped into the desired form such as by rolling into sheets and cutting into sticks, extruded into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

By way of example, and not limitation, examples of the process to make the inventive gum of the present invention are detailed in the examples below. These are presented to exemplify embodiments of the present invention and in no way are presented to limit the scope of the present invention.

EXAMPLES

Miscibility of Poly(D,L-lactic Acid) and Poly(D,L-lactic Acid-co-glycolic Acid) with Plasticizers Selection of the right or miscible plasticizers is an important step to make Poly(D,L-lactic acid) and Poly(D,L-lactic acid-co-glycolic acid) elastic. The inventor screened a number of plasticizers, mostly food-grade ones.

Example 1

Poly(D,L-lactic-acid) (courtesy of PURAC Biochem bv, The Netherlands. Its viscosity molecular weight is 42,200 g/mol) was dissolved in toluene to make a 5 wt % solution. After dissolving, the solution was blended with triacetin at a ratio of 100:1. A film was cast from the solution blend. After dried at ambient conditions first, then in vacuum, the film was soft, elastic, and transparent. The glass transition temperature (Tg) of poly(D,L-lactic acid) shifted from 35.8° C. (pure Poly(D,L-lactic acid)) to 12.8° C. as measured on DSC. Therefore, triacetin is a good plasticizer for poly(D,L-lactic acid).

Example 2

Same as Example 1 but poly(D,L-lactic acid) solution-to-triacetin ratio was decreased to 100:2. The resulting film was clear and very soft. Tg determined by DSC was 2.0° C.

FIG. 1 is a comparison of DSC curves of Examples 1 and 2 with pure poly(D,L-lactic acid). The measurements were carried out on a Perkin Elmer DSC-7 differential scanning calorimeter (DSC) with a heating rate of 15° C./min.

Examples 3–6

Same as example 2 but glycerol, tributyl citrate, acetyl tributyl citrate, and caprylic triglyceride replaced triacetin, respectively. The films were clear and soft for citrates but tough for glycerol and caprylic triglyceride. The clear films indicated that these were good plasticizers.

Examples 7–11

Same as Example 2 but different plasticizers were used. It was found that PEG-600 (polyethyleneglycol with molecular weight 600), PPG-4000 (polypropyleneglycol with molecular weight 4000), stearic acid, soya oil, and sunflower oil all produced cloudy or oily films which indicated poor compatibility.

Example 12

Poly(D,L-lactic acid-co-glycolic acid) copolymer (containing 50/50 molar ratio of D,L-lactide and glycolide, also courtesy of PURAC Biochem bv, The Netherlands.) was dissolved in methylene chloride to make a 5 wt % solution. The solution was then blended with triacetin at a ratio of 100:2. A film was cast from the solution blend. After dried at ambient conditions first, then in vacuum, the film was soft, elastic, and transparent.

Examples 13–14

Same as Example 12 but PEG-600 and tributyl citrate were used as the plasticizers. The resulting films were soft and clear (semiclear in the case of tributyl citrate) indicating good compatibility.

Examples 15–20

Same as Example 12, but different plasticizers were used. It was found that caprylic triglyceride, soya oil, sunflower oil, stearic acid, glycerol, and acetyl tributyl citrate were not compatible with poly(D,L-lactic acid-co-glycolide).

Table 1 below summarizes the appearance and compatibility of all the plasticized films.

TABLE 1

Summarizes Visual Miscibility Results of Polymer Films

| Example | Polymer | Plasticizer | Ratio (w/w) | Film Property | Compatibility |
|---------|---------|-------------|-------------|---------------|---------------|
| Control | $P_{DL}LA$ | None | | Clear but tough | |
| 1 | " | Triacetin | 5:1 | Clear and soft | Yes |
| 2 | " | " | 5:2 | Clear & very soft | Yes |
| 3 | " | Glycerol | 5:2 | Clear and soft | Yes |
| 4 | " | Tributyl citrate | 5:2 | Clear and soft | Yes |
| 5 | " | Acetyl tributyl citrate | 5:2 | Clear and soft | Yes |
| 6 | " | Caprylic triglyceride | 5:2 | Clear but tough | Partially |
| 7 | " | PEG-600 | 5:2 | Cloudy & tough | No |
| 8 | " | PPG-4000 | 5:2 | Cloudy | No |
| 9 | " | Stearic acid | 5:2 | Cloudy | No |
| 10 | " | Soya oil | 5:2 | Oily | No |
| 11 | " | Sunflower oil | 5:2 | Oily | No |
| Control | PLGA | None | | Clear but tough | |
| 12 | " | Triacetin | 5:2 | Clear and soft | Yes |
| 13 | " | PEG-600 | 5:2 | Clear and soft | Yes |
| 14 | " | Tributyl citrate | 5:2 | Soft & semiclear | Partially |
| 15 | " | Caprylic triglyceride | 5:2 | Cloudy | No |
| 16 | " | Stearic acid | 5:2 | Cloudy | No |
| 17 | " | Glycerol | 5:2 | Cloudy & oily | No |

TABLE 1-continued

Summarizes Visual Miscibility Results of Polymer Films

| Example | Polymer | Plasticizer | Ratio (w/w) | Film Property | Compatibility |
|---|---|---|---|---|---|
| 18 | " | Acetyl tributyl citrate | 5:2 | Cloudy & tough | No |
| 19 | " | Soya oil | 5:2 | Oily | No |
| 20 | " | Sunflower oil | 5:2 | Oily | No |

Preparation of Chewing Gum Bases and Gums

Example 21

To a laboratory gum base mixer (Plastograph from Brabender Corp., Rochelle Park, N.J.) set at 75° C., 35.7 grams of poly(D,L-lactic acid), 14.3 gram triacetin, and 15.0 grams of talc (mean particle=4.5–5.0 micron) were added and mixed for 10 minutes, then 10.0 grams of talc and 10.0 grams of tall oil glycerol ester were slowly added while the mixer compounded the polymer. After mixing for 10 more minutes, 7 grams of paraffin wax (MP=135 F) and 8 grams of glycerol monostearate were added. The gum base was discharged in 30 minutes (total).

Figure 2:
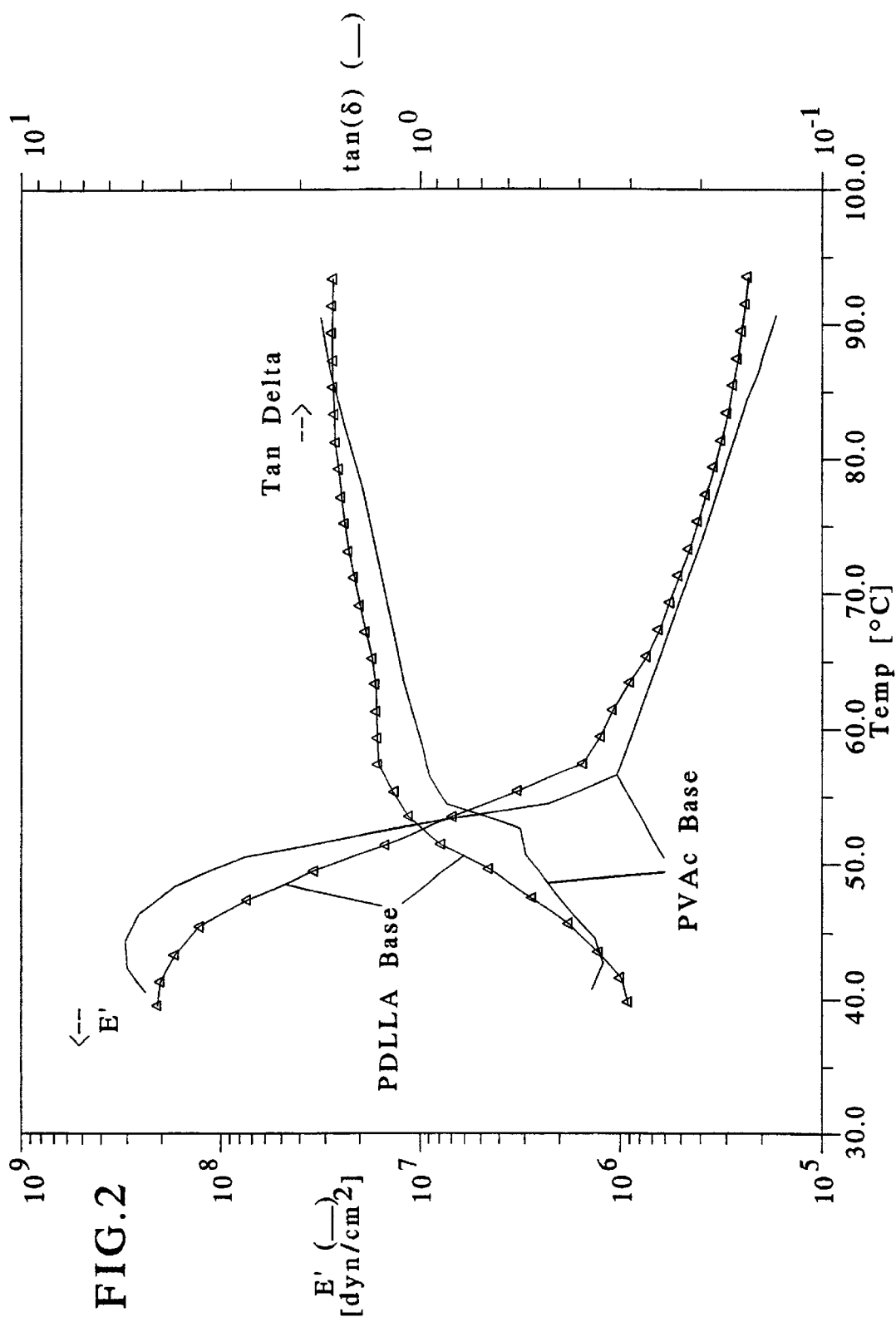
FIG. 2 illustrates, graphically, a comparison of poly(D,L-lactic acid) base on conventional base rheology.

FIG. 2 is a comparison of the rheological properties of this poly(D,L-lactic acid) base and a conventional, PVAc and butyl rubber base. As we can see, both E' and tanδ are fairly close in the entire temperature range.

Example 22

To a laboratory gum mixer set at 55° C. was added 22 grams of gum base Example 21 and 35 grams of 6x sugar. After being mixed for 5 minutes, 20 grams of corn syrup and 20 grams of 6x sugar were added. Mix for 5 minutes. Finally, 0.5 grams of lecithin, 0.4 grams of malic acid, 1.5 grams of glycerol (96%), and 0.6 grams of strawberry flavor (Wrigley) were added. Additional 5 min mixing was continued before discharging. The gum had chewing texture like a conventional poly(vinyl acetate) based chewing gum.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

I claim:

1. A chewing gum comprising:
   plasticized poly(D,L-lactic acid) and poly(D,L-lactic acid-co-glycolic acid).

2. The chewing gum of claim 1 wherein the plasticized poly(D,L-lactic acid) and poly(D,L-lactic acid-co-glycolic acid) have a crystallinity of less than about 18%.

3. The chewing gum of claim 1 wherein the poly(D,L-lactic acid) has a crystallinity of less than about 10%.

4. The chewing gum of claim 1 wherein the poly(D,L-lactic acid) contains at least 5 mole percent of at least one component chosen from the group consisting of D-lactic acid and D-lactide segments.

5. The chewing gum of claim 1 wherein the poly(D,L-lactic acid) has a molecular weight of from 2000 to 2,000,000 g/mol.

6. The chewing gum of claim 1 wherein the poly(D,L-lactic acid) has a molecular weight from 10,000 to 500,000 g/mol.

7. The chewing gum of claim 1 wherein the poly(D,L-lactic acid-co-glycolic acid) has a crystallinity of less than about 10%.

8. The chewing gum of claim 1 wherein the poly(D,L-lactic acid-co-glycolic acid) includes approximately 20 to about 70 mole percent of at least one component chosen from the group consisting of glycolic acid and glicolide.

9. The chewing gum of claim 1 wherein the poly(D,L-lactic acid-co-glycolic acid) has a molecular weight of approximately 10,000 to 500,000 g/mol.

10. The chewing gum of claim 1 including at least one plasticizer chosen from the group consisting of glycerides (mono-, di-, and tri-), adipates, citrates, poly(ethylene lycol), poly(propylene glycol), and phthalates.

11. A gum base comprising:
   plasticized poly(D,L-lactic acid) and poly(D,L-lactic acid-co-glycolic acid).

12. The gum base of claim 11 wherein the poly(D,L-lactic acid) has a crystallinity of less than about 18%.

13. The gum base of claim 11 wherein the poly(D,L-lactic acid) contains at least 5 mole percent of at least one component chosen from the group consisting of D-lactic acid and D-lactide segments.

14. The gum base of claim 11 wherein the poly(D,L-lactic acid) has a molecular weight from 2000 to 2,000,000 g/mol.

15. The gum base of claim 11 wherein the poly(D,L-lactic acid) has a molecular weight from 10,000 to 500,000 g/mol.

16. The gum base of claim 11 wherein the poly(D,L-lactic acid-co-glycolic acid) has a crystallinity of less than about 18%.

17. The gum base of claim 11 wherein the poly(D,L-lactic acid-coglycolic acid) includes approximately 20 to about 70 mole percent of at least one component chosen from the group consisting of glycolic acid and glicolide.

18. The gum base of claim 11 wherein the plasticized poly(D,L-lactic acid) and poly(D,L-lactic acid-co-glycolic acid) comprises approximately 10 to about 70% by weight of the gum base.

19. A method of manufacturing gum base comprising the step of:
   plasticizing poly(D,L-lactic acid) and poly(D,L-lactic acid-co-glycolic acid) and adding the resultant product to other gum base components.

20. The method of claim 19 wherein the resultant product comprises approximately 20 to about 70 weight percent of the gum base.

21. A method of manufacturing chewing gum comprising the step of:
   adding a gum base including plasticized poly(D,L-lactic acid) and poly(D,L-lactic acid-co-glycolic acid) to a water soluble chewing gum portion.

* * * * *